(No Model.)
W. CONNOLLY.
FILTER.
No. 426,489. Patented Apr. 29, 1890.
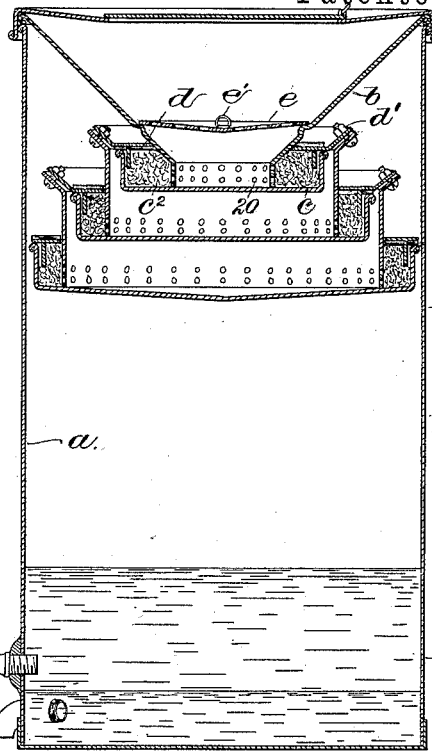
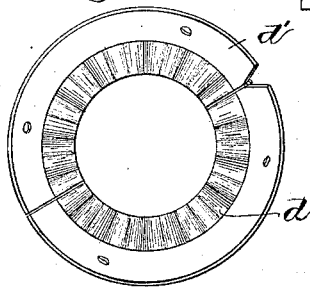
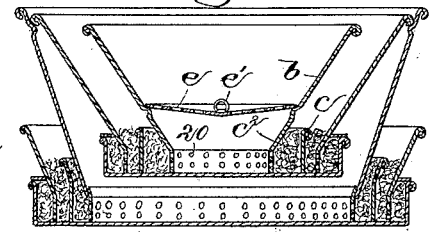
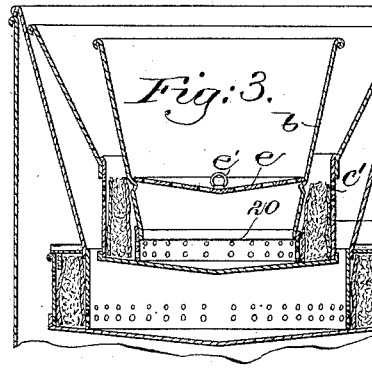
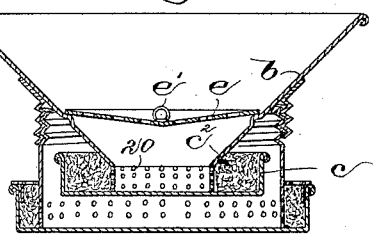
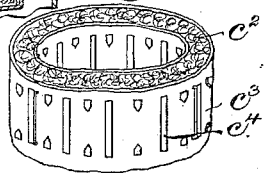
Witnesses.
Howard F. Eaton.
Frederick L. Emery.
Inventor:
William Connolly,
by Crosby & Gregory
Attys

UNITED STATES PATENT OFFICE.

WILLIAM CONNOLLY, OF BOSTON, MASSACHUSETTS.

FILTER.

SPECIFICATION forming part of Letters Patent No. 426,489, dated April 29, 1890.

Application filed May 4, 1889. Serial No. 309,631. (No model.)

*To all whom it may concern:*

Be it known that I, WILLIAM CONNOLLY, of Boston, county of Suffolk, State of Massachusetts, have invented an Improvement in Filters, of which the following description, in connection with the accompanying drawings, is a specification, like letters on the drawings representing like parts.

This invention has for its object to improve the construction of oil filters or strainers—such, for instance, as shown in Patent No. 323,637, dated August 4, 1885.

In accordance with this invention, a pail or bucket is placed in a surrounding or inclosing chamber, the walls of which extend from the bottom of said pail or bucket upwardly for a short distance. The side wall of the pail or bucket at its lower end is perforated, and the side wall of the inclosing-chamber is perforated at its upper end, and said inclosing-chamber contains the filtering material. The bottom of the pail or bucket is imperforate, so also is the bottom of the inclosing-chamber, so that the oil contained in the pail or bucket passes through the perforations at the lower end thereof, upwardly through the filtering material, and out through the perforations at the upper end of the inclosing-chamber or over the upper edge thereof. I may, if desired, employ several pails or buckets and inclosing-chambers therefor containing filtering material nested together, or one only may be employed. The filtering material which I prefer to employ consists of cotton in any form, or equivalent, held in place by a binding material—such, for instance, as pieces of cloth suitably fastened to it or a folded piece of cloth—and, if desired, a cap or cover may be placed on the inclosing-chamber containing the filtering material. When several pails or buckets and inclosing filter-chambers are employed, they may be secured together by fastenings of any desired form, several different forms being herein shown.

Figure 1 shows a vertical section of an oil filter or strainer embodying this invention; Figs. 2, 3, and 4, vertical sections of a nest of buckets having modified forms of filter cases or chambers and different means for holding the parts together; Fig. 5, a perspective detail of the filtering material which I prefer to employ; Fig. 6, a vertical section of the material shown in Fig. 5, and Figs. 7 to 11, views of the caps or covers for the filter-chambers.

The tank $a$, of any suitable size and shape, contains the filter buckets or pails and also suitable faucets. The pail or bucket $b$, into which the oil to be filtered is placed, is of any desirable shape and size, it having an imperforate bottom, and also having at or near the bottom perforations, as at 20, in the side walls thereof. The lower end of the pail or bucket $b$ is rigidly set in or attached to an inclosing-chamber $c$, the outer side wall of which rises above the perforations 20, said inclosing-chamber $c$ having an imperforate bottom, preferably conical, although shown as flat, and also forming the imperforate bottom of the pail $b$. The inclosing-chamber $c$ contains the filtering material $c^2$, which is herein shown as cotton, (see Fig. 5,) held in place between a piece or pieces of cloth $c^3$ by suitable fastenings $c^4$. The oil placed in the pail or bucket $b$ passes through the perforations therein at its lower end, thence forced by pressure up through the filtering material contained in the inclosing-chamber which surrounds the pail or bucket, and thence over the edge of the outer wall. The oil may then pass into a tank, as $a$, or, if several pails or buckets are employed, it will then pass into the next pail or bucket, and so on.

Instead of a solid or imperforate outer wall or inclosing-case, perforations, as $c'$, (see Fig. 3,) may be made through the side walls of the said inclosing-chamber containing the filtering material, or such perforations or openings may be formed by placing a corrugated cap, as $d$, (see Figs. 1, 7, 10, and 11,) placed on the filter-chamber, the said corrugations presenting the openings.

As shown in Fig. 7, the corrugated cap or cover has a flange $d'$, to which a second pail or bucket may be attached, to thereby enable a nest of pails or buckets and inclosing filter-chambers to be built and permitting the bottoms of the inside pails and inclosing-chambers to be suspended above the surface of the liquid contained in the second and third pails, &c.

In Figs. 8 and 9 the cap or cover, as $d$, is shown; but instead of corrugations holes are shown, which serve as the outlets. The cap $d$ is preferably formed of two or more parts hinged together, or the hinge may be omitted.

In Figs. 2 and 4 the cap or cover of the filter-chamber is deemed unnecessary, except in the last or outer inclosing-chamber, both inclosing-chambers permitting the oil to escape directly over the edge thereof.

A perforated plate $e$ is placed in the pail or bucket $b$ at a point above the perforations in the inclosing-chamber or its outlet, said plate serving to retain foreign particles, like chips, &c., such plate having a ring $e'$, by which it may be removed at will.

I claim—

1. In an oil-filter, one or more pails or buckets, an inclosing-chamber for the pails or buckets containing filtering material, combined with caps or covers therefor, having flanges outwardly turned, by which the said pails or buckets may be connected, substantially as and for the purposes set forth.

2. An oil-filter comprising one or more pails or buckets having imperforate bottoms and perforations in the side walls near the bottom, combined with one or more inclosing-chambers containing filtering material extending above said perforations, said filtering material being held in place in the chamber by a binding of textile material, having fastenings $c^4$ extended therethrough, substantially as described.

3. An oil-filter comprising one or more pails or buckets, having perforations in the side walls near the lower end, combined with one or more inclosing cases or chambers, surrounding the lower ends of the pails or buckets, and outwardly-turned flanges or fastenings adapted to rest upon the adjacent pail or bucket, by which the several pails or buckets are retained in position, substantially as described.

4. An oil-filter comprising one or more pails or buckets having perforations near the lower end, and one or more inclosing filter cases or chambers, combined with a perforated plate $e$, placed in the pail or bucket, and annular corrugated covers for the filter-cases, substantially as described.

5. An oil-filter comprising one or more pails or buckets, having perforations near its lower end and one or more filter-chambers containing filtering material, combined with separable annular caps or covers for the filter-chambers adapted to fit over said filtering material, substantially as described.

In testimony whereof I have signed my name to this specification in the presence of two subscribing witnesses.

WILLIAM CONNOLLY.

Witnesses:
BERNICE J. NOYES,
B. DEWAR.